Nov. 4, 1969    O. M. ARNOLD ETAL    3,475,881

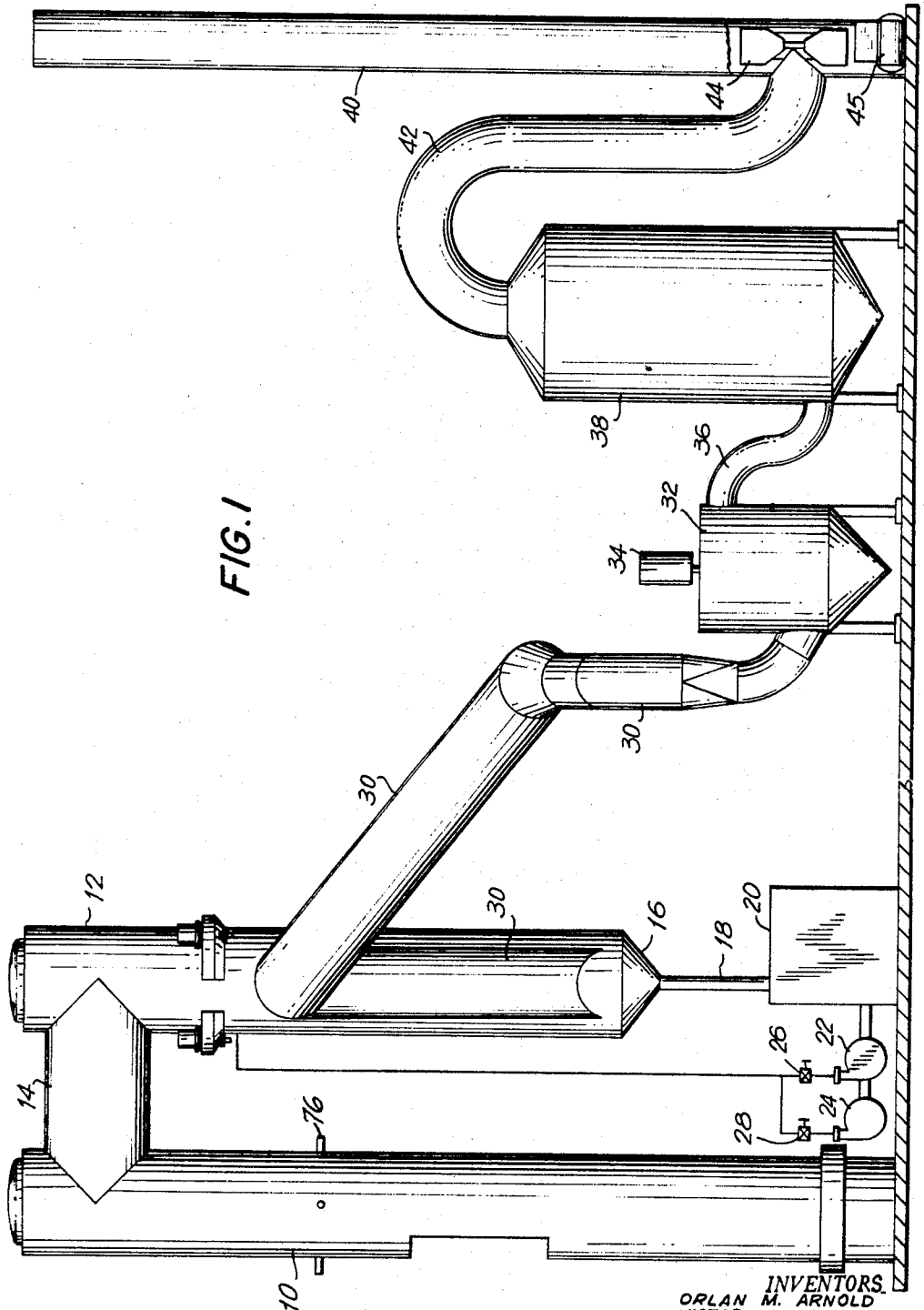

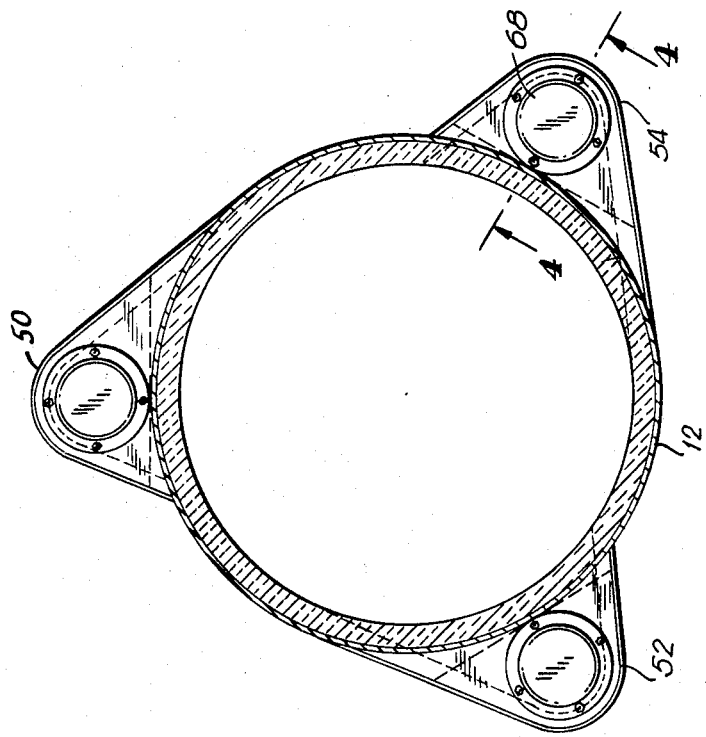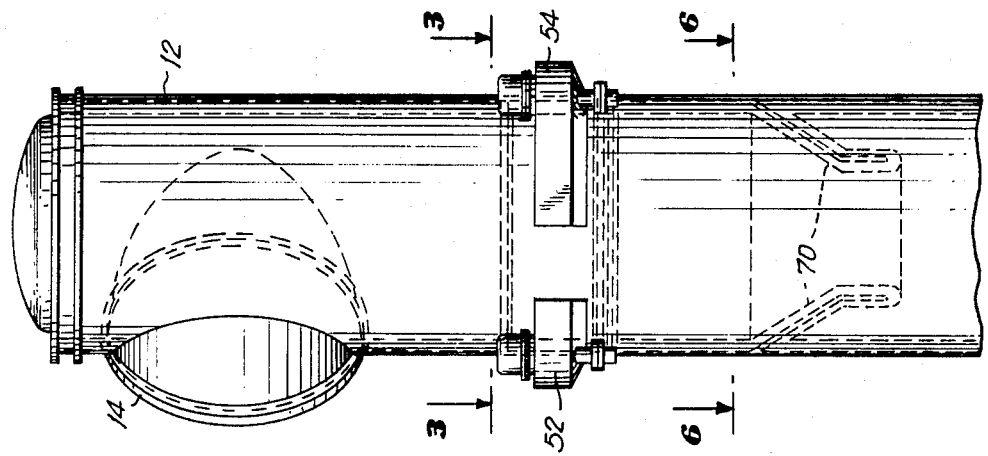

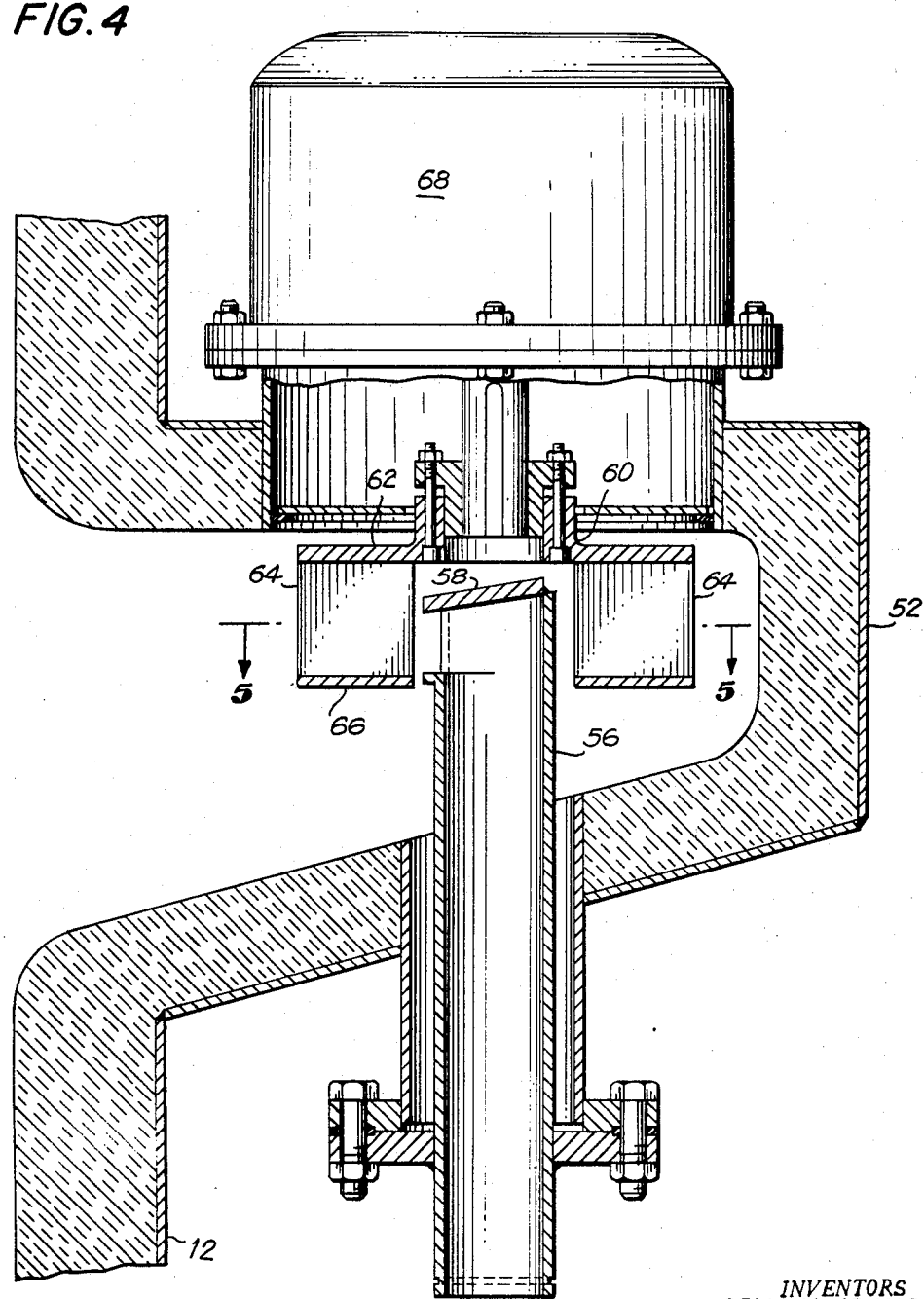

METHOD AND APPARATUS FOR CLEANING CONTAMINATED GASES

Original Filed Oct. 14, 1966    4 Sheets-Sheet 4

INVENTORS.
ORLAN M. ARNOLD
VICTOR W. HANSON
ROBERT M. JAMISON
NICHOLAS J. PANZICA
EMIL UMBRICHT

BY Curtis, Morris + Safford

ATTORNEYS

United States Patent Office 3,475,881
Patented Nov. 4, 1969

3,475,881
METHOD AND APPARATUS FOR CLEANING CONTAMINATED GASES
Orlan M. Arnold, Grosse Point Park, Victor W. Hanson, Garden City, Robert M. Jamison and Nicholas J. Panzica, Detroit, and Emil Umbricht, Northville, Mich., assignors to Ajem Laboratories, Inc., Livonia, Mich.
Continuation of application Ser. No. 586,812, Oct. 14, 1966. This application Apr. 8, 1968, Ser. No. 719,767
Int. Cl. B01d 47/06
U.S. Cl. 55—94         11 Claims

ABSTRACT OF THE DISCLOSURE

An improvement in an air pollution control system for cleaning contaminated gases (including the hot gases such as issue from cupola furnaces) which preconditions the contaminated gases by saturating with a selected liquid (usually water), cooling, and condensing the resulting vapor causing it to adsorb on the solid contaminants and thereby to form aggregations of droplet-borne contaminants which having a larger size either fall out of the gases or are more easily removed by the conventional gas washer to which they are then presented. The saturating is accomplished by a high velocity, intense spray which is generated to uniformly treat the contaminated gases with a cleaning, as well as a saturating, spray pattern. Ambient air may be introduced beyond the saturating spray, or the saturated gases may be cooled, to aid the condensation. Afterburners may be introduced before the spray to burn out many of the contaminants and simultaneously activate the remaining particles to cooperate with the foregoing improvement to result in even greater aggregation for facilitating contaminant removal.

---

This is a continuation of copending application Ser. No. 586,812, filed Oct. 14, 1966, now abandoned.

The present invention relates, in general, to the removal of contaminants from contaminated gases and, in particular, to a method and apparatus for removing pollutants from the gaseous discharge of a cupola furnace.

Public attention is being drawn more and more to the problem of atmospheric pollution. The dangers and hazards to human, animal and plant life presented by air pollution are increasing, particularly in urban, industrialized areas where the concentrations of population and manufacturing activities already are great and are growing steadily. Air pollution also has caused damage and loss of property such as homes and automobiles.

Civic organizations and governmental authorities at all levels are taking more of an interest in the problem of atmospheric pollution and are seeking ways of preventing, controlling and minimizing air pollution and its effects. Such action is manifested, for example, in the form of statutes, ordinances, codes, regulations, studies and grants. Generally, these efforts are designed to strike at the heart of the pollution problem, namely, the major sources of air pollution where contaminants and pollutants are released to the atmosphere.

Illustrative of these sources of air pollution are steel and oher metal refining operations, chemical manufacturing and processing facilities, petroleum refineries, foundries and large-scale painting operations. These facilities, as well as others, pollute the atmosphere as gases are exhausted from the particular operation. These gases commonly contain foreign materials in the form of solid particulates or aerosols or mists.

Some strides have been made toward purifying gases produced in industrial operations prior to their release into the atmosphere in order to prevent air pollution. Often, these steps have been taken under the pressure of governmental enforcement. In many cases, the equipment employed in purifying industritl gases has not performed adequately in comparison to regulations and codes, particularly where the regulations and codes are stringent. This problem is becoming more acute in that the local governments in most industrial areas continue to enact stricter regulations and codes.

One of the more difficult problems in purifying industrial gases is the removal of contaminants and pollutants which are of small size. Generally, ultra-fine particles in the submicron size range constitute a significant portion of the pollutants being discharged from an industrial facility into the atmosphere. With the increasingly stringent requirements on the level of contaminants, particularly in the submicron size range, allowable to be vented to the atmosphere, the need has arisen for the development of more efficient and effective pieces of equipment for purifying industrial gases.

Accordingly, it is an object of the present invention to provide a new and improved method and apparatus for removing the contaminants from a contaminated gas.

It is another object of the present invention to provide new and improved apparatus for removing the contaminants from a contaminated gas which operates in a highly efficient manner and is effective in removing a relatively high percentage of the contaminants.

It is yet another object of the present invention to provide contaminant removal apparatus which is capable of handling relatively large quantities of contaminated gases.

It is still a further object of the present invention to provide contaminant removal apparatus which is versatile and reliable in operation and easily assembled, serviced and maintained.

It is a specific object of the present invention to provide a new and improved method and apparatus for removing the pollutants from the gaseous discharge of a cupola furnace.

Briefly, the method and apparatus of the present invention involves a preconditioning a contaminated gas to remove a portion of the contaminants and to facilitate removal of the remaining contaminants at a subsequent stage by conventional gas washing techniques. This preconditioning includes saturating the contaminated gas with a water spray and condensing the resulting vapor. The effect of this saturation and condensation is a cooling of the gas, a collection of a certain portion of the contaminants, generally the larger size contaminants, and the formation of larger masses, generally containing the smaller size contaminants. By presenting the smaller size contaminants in larger masses to a conventional gas washer, the gas washer is more effective in removing the smaller size contaminants.

In a specific embodiment of the present invention, the pollutant laden gaseous discharge of a cupola furnace, a major source of air pollution, is saturated and condensed in a downcomer positioned alongside the cupola furnace. The saturation is effected by means of an intense water spray through which the gaseous discharge is passed. Condensation is effected either by means of cooling of the gaseous discharge below the saturation temperature or the introduction of ambient air into the downcomer or a combination of the two.

In the specification and in the accompanying drawings there are described and shown an illustrative embodiment of the invention and various modifications thereof are suggested, but it is to be understood that these are not intended to be exhaustive, but on the contrary are given for purposes of illustration in order that others skilled in the art may fully understand the invention so that they may modify and adapt it in various forms, each as may be best suited to the conditions of a particular use.

The various objects, aspects, and advantages of the present invention will be more fully understood from a consideration of the following specification in conjunction with the accompanying drawings in which.

FIGURE 1 illustrates apparatus constructed in accordance with the present invention for removing pollutants from the gaseous discharge of a cupola furnace;

FIGURE 2 is an enlarged showing of a portion of the downcomer of FIGURE 1;

FIGURE 3 is a horizontal section taken along line 3—3 of FIGURE 2;

FIGURE 4 is a vertical section taken along line 4—4 of FIGURE 3;

Figure 5:
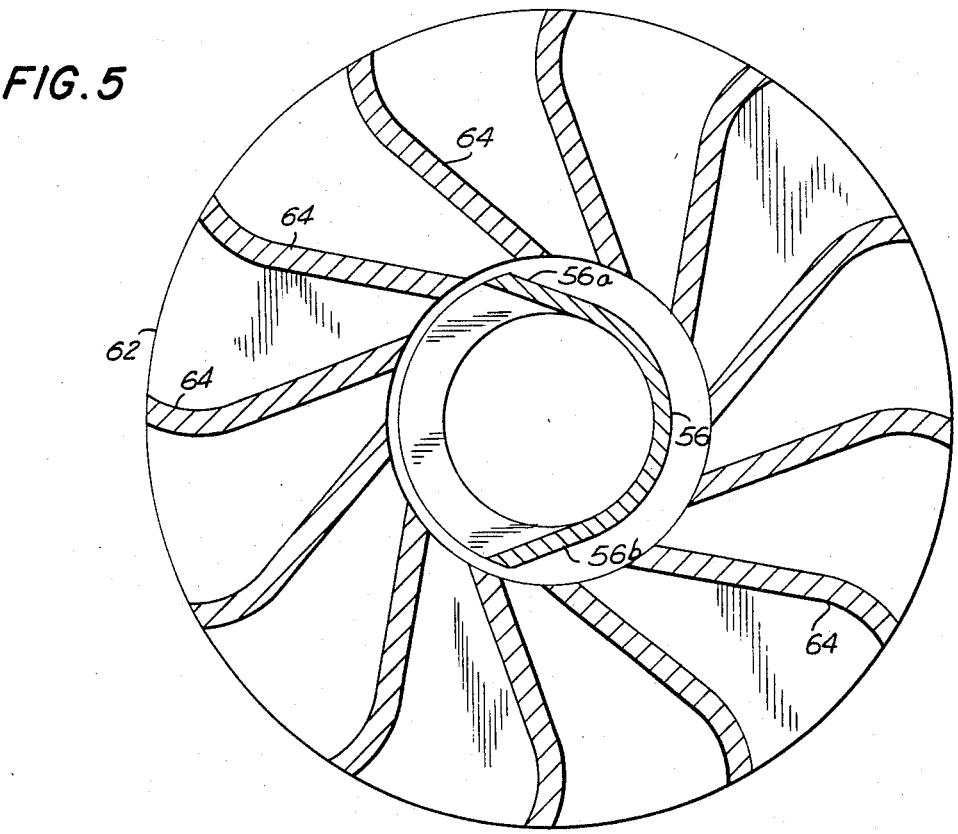
FIGURE 5 is a horizontal section taken along line 5—5 of FIGURE 4.
Figure 6:
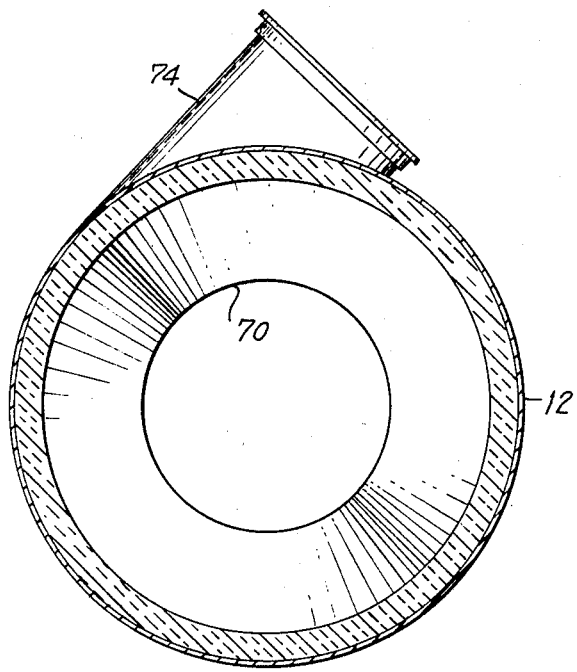
FIGURE 6 is a horizontal section taken along line 6—6 of FIGURE 2.

FIGURE 1 illustrates pollutant removal apparatus constructed in accordance with the present invention located alongside a cupola furnace 10. The pollutant laden gaseous discharge of the cupola furnace 10 is supplied to a downcomer 12 through a crossover 14. This gaseous discharge may range in temperature from ambient temperature to 2000° F., or even higher. Except for a portion of the downcomer to be described in greater detail hereinafter, the downcomer 12 may be of conventional construction and operation.

As the gaseous discharge from the cupola furnace 10 passes downwardly through the downcomer 12, it is saturated with water vapor as it passes through an intense water spray and the resulting vapor is condensed, in a manner to be described in greater detail hereinafter, whereby the gaseous discharge is cooled below saturation temperature to 100° F. or even lower. A portion of the pollutants, generally the larger size particles, is collected, and larger masses of generally smaller size particles are formed. Among the phenomena which take place at the zone of saturation and condensation are the aggregation of many smaller size particles into larger particle masses and the formation of water droplets and aerosols containing small particles. The larger particle masses and the droplets and aerosols containing particles are of a larger size than the small particles themselves so that the portion of the pollutants not captured in the downcomer is in better condition for collection by the gas washing equipment located downstream from the downcomer and to be described in greater detail hereinafter.

Generally, the larger size particles fall freely into a conical collector 16 at the bottom of the downcomer 12. In addition, some of the particle laden droplets fall into the conical collector 16. These pollutants are flushed out of the conical collector 16 through a pipe 18 to a tank 20. Tank 20 may be a sedimenting tank or a recirculation tank where water is held for reuse in the spray systems in the downcomer. The spray systems receive the required quantities of water by means of a pair of pumps 22 and 24 which pump clean water from the tank 20 through a pair of valves 26 and 28.

The reduction in temperature of the gaseous discharge permits passing the gaseous discharge containing the uncollected pollutants to gas washing equipment downstream of the downcomer where those pollutants not captured by the downcomer are collected. A duct system 30 communicates with the downcomer 12 at the lower end of the downcomer and extends upwardly to a crest where it undergoes a reversal in direction and extends downwardly to a wet-type collector 32 of conventional construction and operation. A spray pattern of washing liquid droplets is developed in the collector 32 in the usual manner, for example by means of a rotating cage distributor driven by a motor 34 (similar to the distributor 60 illustrated in FIGURES 4 and 5). The gaseous discharge introduced to the collector 32 passes through the spray pattern of washing liquid droplets developed therein. Particulate matter is entrapped by the washing liquid droplets and thereby collected. By having preconditioned the gaseous discharge in the downcomer, the collector 32 is more effective in removing pollutants, particularly the particles in the submicron size range, from the gas delivered from the downcomer.

A duct 36 leads from the collector 32 to a moisture eliminator 38 which, in turn, communicates with an exhaust stack 40 through a duct 42. A fan 44, located at the base of the stack and driven by a motor 45, draws the gaseous discharge from the cupola furnace 10 through the downcomer 12, the duct system 30, the collector 32, the duct 36, the eliminator 38 and the duct 42. The moisture eliminator 38 serves to remove washing liquid droplets which may be carried out of the collector 32 by the draft created by the fan 44. The output from the eliminator 38 is drawn through the duct 42 and released to the atmosphere through the exhaust stack 40.

FIGURES 2 through 6, inclusive, are various views illustrating one type of equipment which is found highly efficient for developing an intense spray pattern of liquid droplets within the downcomer 12 for saturating the gaseous discharge from the cupola furnace 10 and for condensing the resulting vapor. For the embodiment illustrated, this equipment includes three spray generator units disposed 120° apart in the downcomer 12 and housed in shells 50, 52 and 54 in the wall of the downcomer in such a manner as to be out of the flow of the hot gaseous discharge as it passes through the spray pattern.

FIGURE 4, which is a vertical section taken along line 4—4 of FIGURE 3, and FIGURE 5, which is a horizontal section taken along line 5—5 of FIGURE 4, illustrate the details of the spray generator units. Each of these units includes a stationary pipe 56 to which water is supplied under pressure. The pipe 56 has an opening at its upper end which extends for approximately 180° around its periphery and is bounded on its lateral edges by side members 56a and 56b. A sloping cap 58 serves to close off the upper end of the pipe 56. By means of this arrangement, water is ejected from the pipe 56 over a limited angle, namely, the angle of the opening in the upper end of the pipe.

Surrounding the pipe 56 is a bladed distributor 60. The distributor 60 includes a flange 62 to which is secured a plurality of blades 64, most clearly illustrated in FIGURE 5. The opposite edges of the blades 64 are secured to a ring 66 which is provided to increase the rigidity of the unit.

The flange 62 is coupled to a motor 68 by suitable means. Motor 68 causes the distributor 60 to rotate about pipe 56 so that as water is ejected from the pipe and impinges upon the blades 64, water droplets are developed which are thrown into the downcomer.

The three spray generator units function together to develop an intense spray of liquid droplets within the downcomer. In order to develop the most effective spray and to prevent channeling of the gas through areas devoid of liquid spray as the gas passes through the downcomer, care must be exercised in the design of the various components which contribute to the development of a uniform spray. Some of the factors which have a bearing upon the effectiveness and intensity of the spray are the shape of the blades 64, the size and angle of the opening in the pipe 56, and the speed of rotation of the distributor 60.

As the water droplets thrown into the downcomer hit the gaseous discharge, the droplets evaporate thereby cooling the gas by the energy absorbed by the latent heat in evaporation of the water. The spray is so intense that a level of saturation of the gas is reached. Further cooling in the heavily water saturated environment with excess of cool water droplets within the downcomer beyond the spray generator zone cause condensation of a portion of the resulting vapor on particulate contaminants which form the seed nucleus similar to the mechanism wherein water vapor of the atmosphere forms mist and rain drops with dust particles in the atmosphere. Where enough minute liquid droplets encasing particulate contaminants join together or otherwise attract enough liquid, then large enough drops are formed to cause much of the contaminants of the gas to literally rain out of the gas and catch in the collector 16. Other particles are removed by the physical washing caused by the falling liquid drops. Those particles not removed in the downcomer are preconditioned into droplets form to be more readily removed in the conventional air washer (i.e., collector 32). It is also noted that the saturation of the gas in the downcomer in many cases results in some of the contaminating gaseous contaminants being absorbed into the rapidly formed condensed liquid droplets. This aforementioned additional cooling may be achieved either by providing additional water from the spray generator units so as to cool the saturated gas or by the introduction of ambient air. For the embodiment being described, ambient air is introduced into the downcomer 12 through a tangential inlet 74, most clearly illustrated in FIGURE 6, to condense the gaseous water vapor. This inlet is located just below the zone at which the gas is saturated. A nozzle shaped restriction is provided in the downcomer in the vicinity of inlet 74 to restrict the flow of the gas in the downcomer. This nozzle shaped restriction is formed by an open inverted truncated cone 70, the sides of which extend from the inside wall of the downcomer 12. The truncated cone 70 creates turbulence in the flow of the gaseous discharge passing downwardly through the downcomer 12 so as to improve the mixing of the ambient air which is introduced into the downcomer through the tangential inlet 74 with the saturated gas. As a result, more of the vaporous gas is condensed into droplets giving better conditioning of the gas for the subsequent gas washing operation.

It has been found that use of an afterburner 76 before the downcomer 12 in a cupola furnace system incorporating the present invention gives an unexpectedly significant improvement in the removal of contaminants. Afterburners have been used in the past with cupola furnace systems for the conventional purpose of burning off dangerous carbon monoxide present in the fumes from the furnace and for reducing several other particulate contaminants, particularly organic, to harmless gases. Such systems incorporating afterburners have occasionally also included downcomers which have simple nozzle sprays giving low-volume, low-velocity, nonuniform, nonsaturating water spray patterns with coarse droplet sizes presenting very limited liquid surface exposure to the gas flow and also negligible velocity and impingement of the droplets into the gas flow area. These systems were not noticeably improved by coupling with afterburners. The unique improvement found to occur when afterburners are coupled with a downcomer 12 incorporating the present invention appears to result from two reasons; although applicants do not wish to be limited by any theory advanced to explain this or any other aspect of their invention. It appears that the high temperatures generated by the furnace and the afterburner physically and chemically activate the surfaces of inorganic particulate contaminants (e.g., desorbing gases from iron oxide) causing them to attract one another and also adsorb water vapor in the new intense water spray gas cooling and saturating zone with formation of small droplets so as to combine or coalesce therewith to form relatively larger conglomerations which are more easily removed from the gaseous discharge. Because of the elevated temperatures generated by the afterburner in excess of the heat from the furnace, which results in a greater temperature differential in the downcomer particularly at the spray zone, by the present invention assure these previously heat surfaces activated particles in being present in their activated state so as to be subjected while in this state to intimate contact with saturating and cooling water vapor atmosphere resulting in more vapor being adsorbed and condensed out with more contaminants therefore being removed. In one test, a gaseous discharge introduced into the downcomer at a temperature of 1000° F. was cooled to a temperature of 115° F.

Various alternative arrangements of the equipment which develops the intense spray in the downcomer, for example, more than three spray generator units disposed at different angles than 120° may be employed. In addition, the spray generator units may be positioned at different levels within the downcomer. Furthermore, more than one set of spray generator units may be provided so as to result in multiple saturation and condensation zones.

In certain applications, it may be desirable or even necessary, to provide another cooling stage in the moisture eliminator. For example, gases having an extremely high proportion of submicron size particles are difficult to clean. By providing cooling stage in the moisture eliminator, additional washing, entrapment and cooling takes place. In particular, larger masses containing smaller size particles also are formed in the eliminator. As the droplets are collected in the moisture eliminator, particulate matter, for example, contained in the droplets also is collected. In addition, because of the condensation which results from this cooling, the moisture content of the gas is reduced and steam plume thereby is reduced.

One preferred arrangement for effecting the desired cooling in the moisture eliminator is by cooling the water supplied to a system of overflow troughs. These troughs may be positioned above the moisture connecting surfaces so that cleaning liquid drains over these surfaces to keep them clean. In order to provide the desired additional cooling in the moisture eliminator, the temperature of the overflow liquid may range from 45° F. in the winter to 90° F. in the summer.

Although the invention has been described in connection with the removal of pollutants from the gaseous discharge of a cupola furnace, it will be apparent that the invention may be employed for cleaning contaminated gases orginating at other sources. In this event, a chamber, opened or closed to the atmosphere and generally similar to the downcomer 12, is provided. The contaminated gas is saturated with a selected liquid so as to develop a vapor from this liquid which can be condensed to capture air borne solid particulate matter and aerosols or which will be an absorbing media for gaseous molecular species. The nature of the liquid used to saturate the contaminated gas is dependent upon the particular operation in question. If the contaminated gas is not introdouced to this chamber at a high temperature, it may be necessary to refrigerate the spray liquid or the cooling air or both in order to condense the vaporous gas. If additional cooling is provided in the moisture eliminator it may be necessary to refrigerate the cooling liqiud at this stage also.

While there have been described what are at present considered to be the preferred embodiments of this invention it will be obvious to those skilled in the art that various changes and modifications may be made therein without departing from the invention and it is, therefore, aimed to cover all such changes and modifications as fall within the true spirit and scope of the invention.

We claim:

1. Method of removing pollutants from the gaseous discharge of a cupola furnace comprising the steps of:
    subjecting the discharge to an intense high-temperature and essentially complete burnout;
    promptly subjecting the super heated discharge flow to a massive bombardment of fine, high-velocity and relatively cool liquid droplets which dynamically sweep in an effectively uniform spray pattern completely into an across the discharge flow in quantities sufficient to saturate as well as cool and partially clean said flow;

passing said flow through an area affording time for condensation of said cleaning liquid upon pollutants and for aggregation of such wetted pollutant and for collecting and removing droplets and pollutants falling out of said flow;

passing said pretreated discharge flow through a high velocity rotary generated cleaning liquid spray pattern in a gas washer;

and removing said liquid from said discharge flow.

2. The method as claimed in claim 1 wherein said burnout temperature ranges generally around 1000° F. to 2000° F., further comprising the step of constricting the cross-sectional flow area just after the saturation step and directing said discharge flow downwardly toward a collecting basin of liquid and abruptly reversing direction.

3. The method as claimed in claim 2 further comprising the step of introducing air at the ambient temperature into the discharge flow after said constriction and wherein said step of removing liquid from the discharge flow is accomplished by passing over liquid-adsorbent surfaces which are washed by a countercurrent of larger flushing particles of liquid.

4. Apparatus for removing the contaminants of a contaminated gas comprising:
a chamber to which said contaminated gas is supplied;
a plurality of segmentally directed rotary-spray generators for forming an intense saturating spray pattern in which fine high-velocity liquid droplets are thrown in uniform sweeps into and across the flow of said contaminated gas whereby said gas is partially cleaned of contaminants and is saturated with a vapor from said droplets, said segmental spray generators being spaced about the outside of said chamber near the inlet of said contaminated gas;
an area within said chamber for condensing the resulting vapor, whereby a portion of said contaminants are formed into larger masses;
means within said chamber for collecting a portion of said contaminants;
and separate means in fluid communication with said chamber for removing from said contaminated gas those contaminants not collected in said chamber.

5. Apparatus according to claim 4 wherein said separate means is a wet-type collector comprising a remote chamber and a rotating spray generating distributor therein to wash out substantially all of the remaining contaminants by generating an intense spray pattern in which fine high-velocity liquid droplets are thrown to uniformly sweep into and across the flow of said gas through said remote chamber.

6. Apparatus according to claim 4 further comprising means for substantially eliminating moisture from said gas before discharge to the atmosphere.

7. Apparatus according to claim 6 wherein said segmental spray generators are three in number and equally spaced.

8. Apparatus for removing the pollutants from the gaseous discharge of a cupola furnace comprising:
a downcomer to which said gaseous discharge is supplied;
segmental rotary spray generators mounted on the outside of said downcomer near its inlet end and positioned to discharge a high velocity massive scavenging and saturating spray into and, in combination, effectively across said gaseous discharge for saturating it with water and for condensing said resulting vapor on said pollutants, whereby said gaseous discharge is cooled and a portion of said pollutants are formed into larger masses;
a catch basin located near the bottom of said downcomer for collecting liquid and a portion of said pollutants;
a separate collector, in angular fluid communication with said downcomer, having a remote chamber and a rotating spray generating distributor therein to wash out substantially all of the remaining contaminants by generating an intense spray pattern in which fine high-velocity liquid droplets are thrown to uniformly sweep into and across the flow of said gas through said remote chamber;
a moisture eliminator for collecting droplets escaping from said collector;
and a fan for moving said gaseous discharge through said downcomer, collector and moisture eliminator.

9. Apparatus according to claim 8 further including an afterburner mounted for pretreating said gaseous discharge and its suspended pollutants prior to being supplied to said downcomer.

10. Apparatus according to claim 8 wherein said saturating and condensing means also include an inlet through which ambient air is supplied to said downcomer.

11. Apparatus according to claim 10 wherein a nozzle shaped restriction is provided in said downcomer in the vicinity of said inlet to restrict the flow of said gaseous discharge in said downcomer.

References Cited

UNITED STATES PATENTS

| 969,769 | 9/1910 | Brassert et al. | 55—257 |
|---|---|---|---|
| 2,005,987 | 6/1935 | Bowen | 239—222.11 |
| 2,294,221 | 8/1942 | Bowen et al. | 239—222.11 |
| 2,940,733 | 6/1960 | Umbricht | 55—222 |
| 3,212,235 | 10/1965 | Markant | 55—89 |
| 3,239,999 | 3/1966 | Price | 55—223 |
| 3,315,443 | 4/1967 | Marino | 55—85 |
| 3,322,508 | 5/1967 | Ungerleider. | |

FOREIGN PATENTS 654,801   12/1962   Canada.

REUBEN FRIEDMAN, Primary Examiner

CHARLES N. HART, Assistant Examiner

U.S. Cl. X.R.

55—223; 261—22, 89; 266—25